US007418200B2

United States Patent
Imai et al.

(10) Patent No.: US 7,418,200 B2
(45) Date of Patent: Aug. 26, 2008

(54) OPTICAL UNIT AND IMAGING DEVICE

(75) Inventors: Satoshi Imai, Kanagawa (JP); Nobuaki Aoki, Tokyo (JP); Tatsuo Makii, Tokyo (JP); Hideki Yamaoka, Gifu (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 10/532,328

(22) PCT Filed: Oct. 24, 2003

(86) PCT No.: PCT/JP03/13644

§ 371 (c)(1),
(2), (4) Date: Apr. 22, 2005

(87) PCT Pub. No.: WO2004/038475

PCT Pub. Date: May 6, 2004

(65) Prior Publication Data

US 2006/0153555 A1 Jul. 13, 2006

(30) Foreign Application Priority Data

Oct. 24, 2002 (JP) ............................ 2002-310201

(51) Int. Cl.
G03B 17/04 (2006.01)
G03B 15/02 (2006.01)
G02B 15/14 (2006.01)
G02B 13/02 (2006.01)
G02B 7/02 (2006.01)

(52) U.S. Cl. .......................... 396/87; 396/79; 396/349; 359/684; 359/696; 359/698; 359/745; 359/817; 348/240.3; 348/347

(58) Field of Classification Search ................ 396/349, 396/75, 79, 80, 85–87, 348; 359/696, 817, 359/684, 745, 698; 348/208.11, 240.3, 345, 348/347

See application file for complete search history.

(56) References Cited

U.S. PATENT DOCUMENTS 6,339,681 B1 1/2002 Takeshita (Continued)

FOREIGN PATENT DOCUMENTS

JP 7-234443 9/1995

(Continued)

OTHER PUBLICATIONS

Patent Abstracts of Japan, publication No. 2000-131729, publication date May 12, 2000.

*Primary Examiner*—Rochelle-Ann Blackman
(74) *Attorney, Agent, or Firm*—Frommer Lawrence & Haug LLP; William S. Frommer; Paul A. Levy

(57) ABSTRACT

A collapsible type optical unit is described that is capable of moving its optical system between a working position and a retracted position as well as an image-pickup apparatus including the optical unit. The optical unit and the image-pickup apparatus are capable of acquiring lens-position information by detecting a position of a lens barrel supported to be movable with respect to a fixed barrel. The collapsible type optical unit includes a second group lens frame movable along a direction of its optical axis with respect to a fixed ring and rear barrel, and a solid-state image-pickup device provided behind the second group lens frame, in which on the movable second group lens frame, a position-detecting means for detecting a position of the second group lens frame is provided.

5 Claims, 6 Drawing Sheets

U.S. PATENT DOCUMENTS

| | | | |
|---|---|---|---|
| 6,469,840 B2 * | 10/2002 | Nomura et al. | 359/699 |
| 6,483,994 B2 * | 11/2002 | Kabe et al. | 396/79 |
| 6,546,202 B1 * | 4/2003 | Onozuka et al. | 396/135 |

FOREIGN PATENT DOCUMENTS

| | | |
|---|---|---|
| JP | 11-109208 | 4/1999 |
| JP | 2000-194046 | 7/2000 |

* cited by examiner

OPTICAL UNIT AND IMAGING DEVICE

TECHNICAL FIELD

The present invention relates to a collapsible type optical unit in which an optical system is movable between a working position and a retracted position, as well as an image-pickup apparatus including the optical unit such as a digital still camera and a digital video camera; and particularly relates to the optical unit and the image-pickup apparatus including the optical unit capable of acquiring information on a lens position (information, for example, on a zoom position) by detecting a position of a lens barrel supported to be movable with respect to a fixed barrel.

BACKGROUND ART

In recent years, the improvement in portability and operability has been demanded for the image-pickup apparatus such as a digital still camera and a digital video camera. The whole camera is now required to be small-sized and the miniaturization of an optical system such as a lens and a lens barrel employed in the image-pickup apparatus has been in progress. In addition, a further enhancement of image-quality and pixels of taken pictures is also strongly requested and lenses forming an optical system may be made large in size; however, the miniaturization of the optical lens barrel is often demanded by making a drive mechanism smaller in size.

There are similar demands with respect to what is called a collapsible lens used in the image-pickup apparatus such as a digital still camera and a digital video camera, and the miniaturization, thin-making and the like are requested in view of convenience for portability.

FIG. 3 shows a state in which, for example, a digital still camera provided with a collapsible type lens is not used and the lens is retracted, that is, shows an outer appearance perspective view of the retracted position of the lens. FIG. 4 shows a state in which a digital camera is used and the lens barrel is extended, that is, shows an outer appearance perspective view of a wide angle position or a telephoto position of the same camera.

FIGS. 5A, 5B and 5C show sectional views of a conventional collapsible lens. FIG. 5A shows a section of the lens in the retracted position when not in use; FIG. 5B shows a section of the wide angle position; FIG. 5C shows a section of the telephoto position. FIG. 6 shows an exploded perspective view of the collapsible lens.

First, main functions of a digital still camera will be described with reference to FIGS. 3 and 4. A reference numeral 1 denotes a camera body of the digital still camera and a reference numeral 2 denotes an image-pickup lens portion of a collapsible type, which is provided on one side of the front surface of the camera body 1. In the collapsed state shown in FIG. 3, barriers 3 protect the front lens surface of the image-pickup lens portion 2. Further, on the front surface of the camera body 1 are arranged a finder lens 4, a strobe 5, and an autofocus-auxiliary-light receiving portion 6 for detecting a distance to a subject. Further, a reference numeral 7 denotes a finder window, a numeral 8 denotes a shutter button, and a numeral 9 denotes a knob for changing the mode.

Next, the structure of the image-pickup lens portion 2 that is a collapsible type optical unit will be described in detail with reference to FIGS. 5A, 5B, 5C and FIG. 6.

A reference numeral 10 denotes a first group lens frame holding a plurality of lenses 11. The first group lens frame 10 includes a plurality of cam pins 10a to be fitted into a first cam groove 12a of a cam ring 12. The first group lens frame 10 is formed of, for example, black polycarbonate resin containing glass fiber and has the strength and a light shielding nature.

A reference numeral 13 denotes a second group lens frame holding a plurality of lenses 13a. The second group lens frame 13 includes a plurality of cam pins 13b to be fitted into a second cam groove 12b of the cam ring 12. The second group lens frame 13 is formed of, for example, black polycarbonate resin containing glass fiber and has the strength and a shielding nature. The second group lens frame 13 may be provided with an iris shutter mechanism.

The above-described cam ring 12 includes a gear portion 12c to be driven to rotate within the internal circumference of a fixed ring 15 by means of a gear 14a of a gear unit 14, and a plurality of cam pins 12d to be fitted into a cam groove 15a of the fixed ring 15. The cam ring 12 is formed of, for example, black polycarbonate resin containing glass fiber, and has the strength and a light shielding nature. By means of the first cam groove 12a and the second cam groove 12b, a zooming operation is performed in which the first group lens frame 10 and the second group lens frame 13 are moved along the predetermined curve in the direction of the optical axis L.

A reference numeral 16 denotes a straight-forward guide ring which is a member that moves within the internal circumference of the fixed ring 15 integrally with the cam ring 12 in the direction of the optical axis L. The straight-forward guide ring 16 includes a plurality of guide grooves 16a which guides the first group lens frame 10 in the direction of the optical axis and a plurality of guide grooves 16b which guide the second group lens frame 13 in the direction of the optical axis. The straight-forward guide ring 16 is formed of, for example, black polycarbonate resin containing glass fiber and has the strength and a light shielding nature.

The fixed ring 15 is a member fixed to a rear barrel 17. The fixed ring 15 is formed of, for example, black polycarbonate resin containing glass fiber and has the strength and a light shielding nature.

A reference numeral 18 denotes a third group lens frame holding a lens 19. The third group lens frame 18 is formed of, for example, black polycarbonate resin containing glass fiber and has the strength and a light shielding nature. The third group lens frame 18 is retained so as to be movable in the direction of the optical axis with respect to the rear barrel 17, which is designed to displace minutely in the direction of the optical axis by means of a power source such as a stepping motor (not shown).

To the rear barrel 17 are fixed the fixed ring 15, a barrier drive mechanism 20, and the gear unit 14. Further, to the rear barrel 17 is fixed an optical filter 22 composed of an optical low-pass filter or an infrared cut filter at a holding portion 21 facing the third group lens frame 18 so as to be positioned by an elastically-forced sealing rubber 23. Furthermore, to the rear barrel 17 is fixed a solid-state image-pickup device 24 such as CCD and CMOS positioned behind the optical filter 22.

The barrier drive mechanism 20 is a projection member for driving to close barriers 3 linked with the collapsing operation of the image-pickup portion 2. The gear unit 14 drives to rotate the cam ring 12 through the gear portion 12c engaged with the gear 14a; and the gear ratio is determined such that a sufficient driving power in the range of collapsed state to wide state to telephoto state, and telephoto state to wide state to collapsed state.

Next, the operation of the above-described image-pickup lens portion 2 will be described.

In operation from the collapsed state in FIG. 5A to the wide position in FIG. 5B, the gear 14a of the gear unit 14 is driven by a driving source such as a DC motor, the gear portion 12c being rotated, the cam pin 12d being rotated along the cam groove 15a of the fixed ring 15, and the cam ring 12 being moved toward a subject in the direction of the optical axis. At this moment, the straight-forward guide ring 16 moves forward integrally with the cam ring 12 as shown by an arrow mark A.

At the same time, the cam pin 10a is moved along the first cam groove 12a of the cam ring 12 and the guide groove 16a of the straight-forward guide ring 16 with the result that the first group lens frame 10 is moved forward as shown by an arrow mark B. Concurrently, the cam pin 13b is moved along the second cam groove 12b of the cam ring 12 and the guide groove 16b of the straight-forward guide ring 16 with the result that the second group lens frame 13 is moved forward as shown by an arrow mark C. With the operation as described above, the first group lens frame 10 and second group lens frame 13 are situated in the optically wide position.

In operation from the wide position to the telephoto position in FIG. 5C, the cam ring 12 is also driven by the gear unit 14; however, because the cam pin 12d moves along a horizontal cam groove 15b of the cam groove 15a in this range, the cam ring 12 does not move in the direction of the optical axis, so that also the straight-forward guide ring 16 does not move in the direction of the optical axis as shown by an arrow mark D. At this moment, the cam pin 10a is moved along the cam groove 12a of the cam ring 12 and the guide groove 16a of the straight-forward guide ring 16 with the result that the first group lens frame 10 is moved in the direction of an arrow mark E.

At the same time, the cam pin 13b is moved along the cam groove 12b of the cam ring 12 and the guide groove 16b of the straight-forward guide ring 16 with the result that the second group lens frame 13 is moved forward in the direction of an arrow mark F. With the operation as described above, the first group lens frame 10 and second group lens frame 13 optically move between the wide position and telephoto position to perform the zooming operation.

In addition, operation from the telephoto position to wide position and operation from the wide position to collapsed state are performed by driving the gear 14a of the gear unit 14 to oppositely rotate and making the cam ring 12 rotate in the opposite direction.

Hereupon, while the first group lens frame 10 and second group lens frame 13 perform the zooming operation, the third group lens frame 18 is displaced minutely in the direction of the optical axis by a separate driving source, not shown, such as a stepping motor to perform focusing operation.

In this way, the image-pickup lens portion 2 makes the first group lens frame 10 and second group lens frame 13 move depending on the position of a subject to selectively perform the zooming operation and focusing operation, so that it is necessary for the image-pickup lens portion 2 to be provided with means for detecting a position of the lens.

As for a conventional zoom position detecting method of the collapsible type lens, for example, a method of detecting the position by a rotation angle of the cam ring and a method of detecting the position by a position of the cam ring in the moving direction are known.

Further, as to the method of detecting position by the rotation angle of cam ring, a method of detecting position by a change in conduction of an electric pattern arranged on an exterior portion of the cam ring, a method of detecting the zoom position, in which a projection for detecting a rotary position and a switch arranged outside thereof are provided on the exterior portion of the cam ring and the switch is operated by the projection, and the like are known.

FIG. 7 shows the former method of detecting a rotary position by an electric contact (brush). In FIG. 7, a reference numeral 50 denotes the image-pickup lens portion of the collapsible type lens, which is designed to be able to take selectively the collapsed position, that is, a retracted state of the lens when not being used, the wide angle position, and the telephoto position. A finder lens 51 is arranged at the upper left of the image-pickup lens portion 50.

A rotary-position detecting means 52 using an electric contact is provided at the top of the image-pickup lens portion 50. The rotary-position detecting means 52 includes an electric contact pattern 53 provided on a rotary part of the lens barrel and a brush portion 54 mounted on a fixed part of the camera body or the like, and a plurality of brushes 55 provided at the brush portion 54 are in slidable contact with the electric contact pattern 53.

Thus, a position of contact of the plurality of brushes 55 with the electric contact pattern 53 varies according to a rotary position of the rotary part of the lens barrel, so that an electric output will be varied depending on the rotary position. By monitoring a change in the electric output, it is possible to detect the zoom position of the lens by the rotary-position detecting means 52.

FIG. 8 shows the latter method of detecting a rotary position by a variable resistor. In FIG. 8, a reference numeral 60 denotes the image-pickup lens portion of a collapsible type lens, which is designed to be able to take selectively the collapsed position, the wide angle position, and the telephoto position as well. A finder lens 61 is arranged at the upper left of the image-pickup lens portion 60 and a rotary-position detecting means 62 using the variable resistor is provided at the lower left of the image-pickup lens portion 60 under the finder lens.

The rotary-position detecting means 62 includes a variable resistor 63 fitted to a fixed part of the camera body or the like, a support member 64 for supporting a detection piece 63a of the variable resistor 63, a lead screw 65 for moving the support member 64 in the direction of an optical axis of the image-pickup lens portion 60, and a gear train 66 which is engaged with a gear portion provided on a rotary part of the lens barrel to transmit the rotational force thereof to the lead screw 65. The gear train 66 includes a driving gear engaged with the gear portion of lens barrel, a screw gear fixed to the lead screw 65, and an idler gear connecting the screw gear and the driving gear to transmit motive power.

Thus, depending on the rotary position of a rotary part of the lens barrel, a resistance value of the variable resistor 63 will change. By monitoring the resistance value output from the variable resistor 63, it is possible to detect the zoom position of the lens by the rotary-position detecting means 62.

As an optical apparatus using the above-described position detecting method, there is also, for example, the one disclosed in Patent Literature 1. The optical apparatus described in the Patent Literature 1 is characterized by including a first lens unit constituting an optical system, a first motor for driving the first lens unit, a second lens unit constituting the optical system, which is provided behind the first lens unit, and a control means for controlling the first and second motors to retract the second lens unit in response to retract instructions of the optical system, to start retracting the first lens unit after the second lens unit has been retracted, and to retract the first lens unit into a space made by retracting the second lens unit.

This optical apparatus is provided with a linear sensor for detecting a lens position, which is fixed to a base by means of a screw and the like. The linear sensor is composed of a variable resistor that generates an output between terminals which linearly changes with its slider moves while a predetermined voltage is applied between the terminals.

Patent Literature 1

Japanese Published Patent Application No. 2000-194046 (page 5, FIG. 12, etc.) However, when among the above described lens position detecting methods the former lens position detecting method according to a rotation angle of the cam ring is employed, it is necessary to arrange a projection, a switch or an electric pattern and the like on an exterior portion of the cam ring, with the result that the exterior portion becomes large in size and also the number of parts as well as the number of processes increase, which causes the problem of not being economical.

When using the latter position detecting method according to a position of the cam ring in its protruding direction, it is necessary to provide a projection on the exterior portion and also to provide a switch or a leaf spring at a predetermined position corresponding to the projection, with the result that, although the number of parts increases less than that in the former method, the exterior portion becomes bulky and against the miniaturization, which poses another problem.

Furthermore, when employing either of the position detecting methods, there exists a sliding portion such as a mechanical switch or brushes for detecting the conduction, so that a load against the lens will occur due to a frictional resistance of the sliding portion. For this reason, there is also posed a problem that movement efficiency of the lens to the driving force will deteriorate.

The present invention has been made to solve the above-described problems and provides an optical unit in which a position detecting means is provided inside the movable lens barrel and the position is detected within the lens barrel, thereby miniaturizing the whole apparatus and also preventing a collision between lens portions arranged in the lens barrel, as well as an image-pickup apparatus including the optical unit.

DISCLOSURE OF THE INVENTION

In order to achieve the above-described object, the optical unit of the present application is a collapsible type optical unit in which at least one lens barrel is movable with respect to the fixed barrel along the direction of its optical axis and an image-pickup means is provided behind the lens barrel, including within the fixed barrel a position-detecting means for detecting the position of the lens barrel provided inside the lens barrel.

Further, an image-pickup apparatus including the optical unit of the present application is, in image-pickup apparatuses provided with a collapsible type optical unit including a fixed barrel, at least one lens barrel movable with respect to the fixed barrel along the direction of its optical axis, an image-pickup means arranged behind the lens barrel, and a position-detecting means for detecting a position of the lens barrel within the fixed barrel, a camera apparatus such as a digital still camera and a digital video camera.

According to the above-described optical unit, because a position-detecting means for detecting a position of the lens barrel is provided within the fixed barrel, it is possible to miniaturize the optical unit by eliminating a projection or the like on the exterior portion and to restrict an increase of the number of parts and the number of processes to its minimum.

Also, according to the image-pickup apparatus including the optical unit, since the optical unit capable of being miniaturized can be employed, it is possible to make the whole apparatus small in size and light in weight.

BEST MODE FOR CARRYING OUT THE INVENTION

Hereinafter, embodiments of a collapsible type optical unit and the image-pickup apparatus including the optical unit according to the present invention will be described with reference to the accompanying drawings.

Figure 1A:
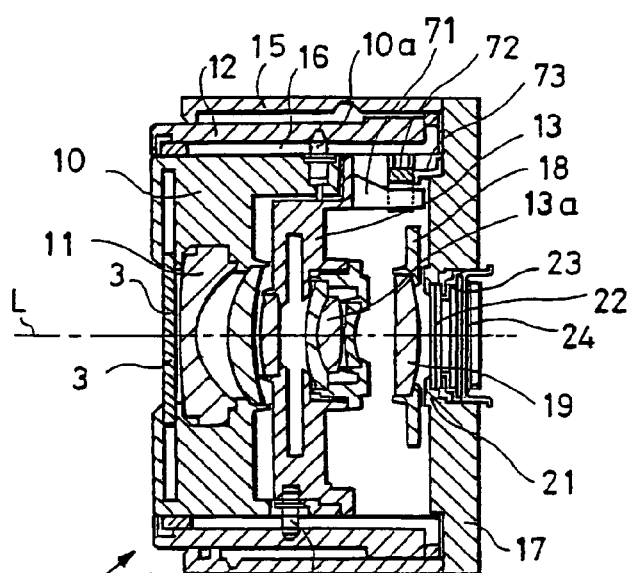
FIG. 1A is a sectional view showing the collapsed state of a first embodiment of the optical unit according to the present invention.
Figure 1B:
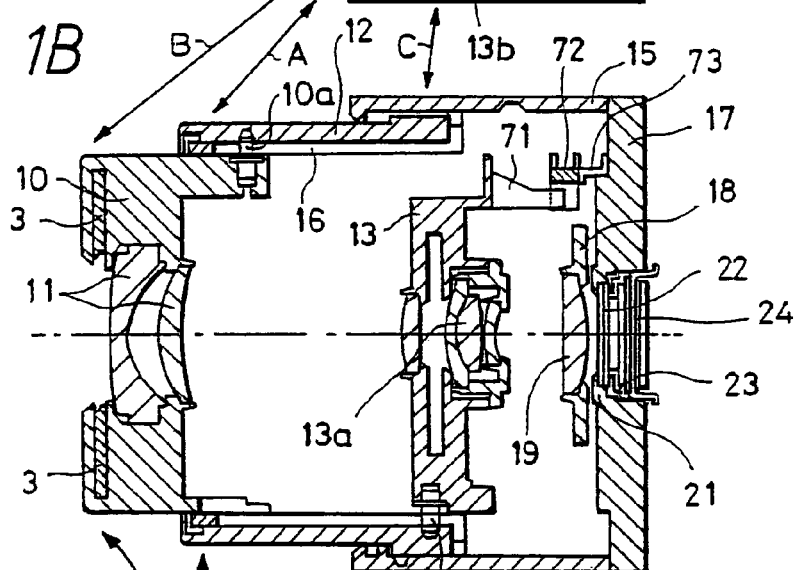
FIG. 1B is a sectional view showing the wide position of the first embodiment of the same optical unit.
Figure 1C:
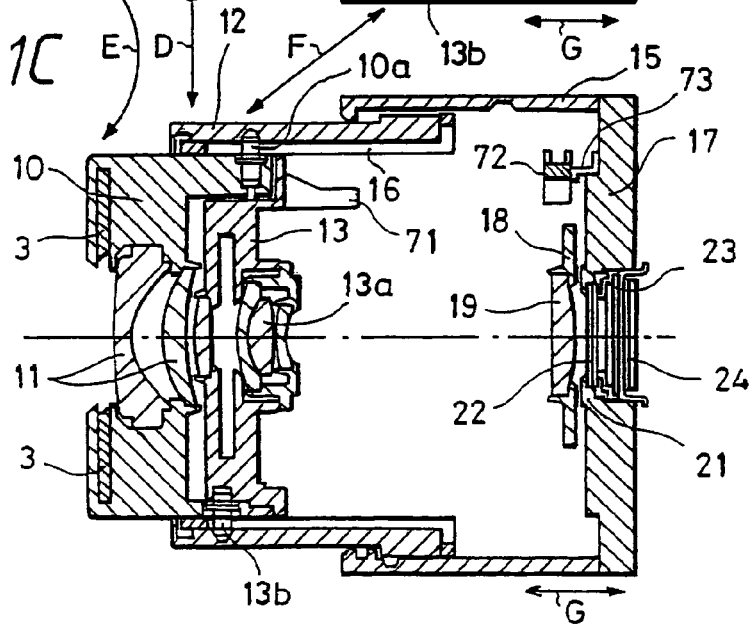
FIG. 1C is a sectional view showing the telephoto position of the first embodiment of the same optical unit.

FIGS. 1A, 1B, and 1C are sectional views of a collapsible type lens according to the present invention. FIG. 1A shows a state of the collapsed position, that is, the retracted state of the lens when it is not in use; FIG. 1B shows a state of the wide angle position; FIG. 1C shows a state of the telephoto position. Note that, in FIGS. 1A, 1B, and 1C, the same parts as described in FIGS. 5A, 5B and 5C are denoted by the same symbols to be explained.

Figure 5A:
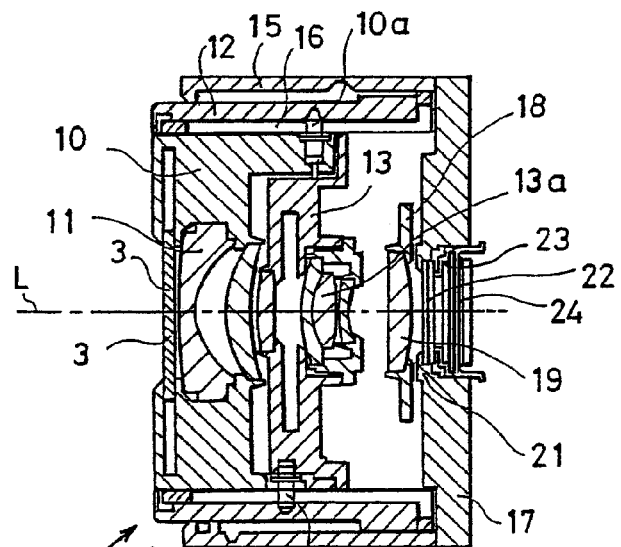
FIG. 5A is a sectional view showing the collapsed state of a conventional optical unit.
Figure 5B:
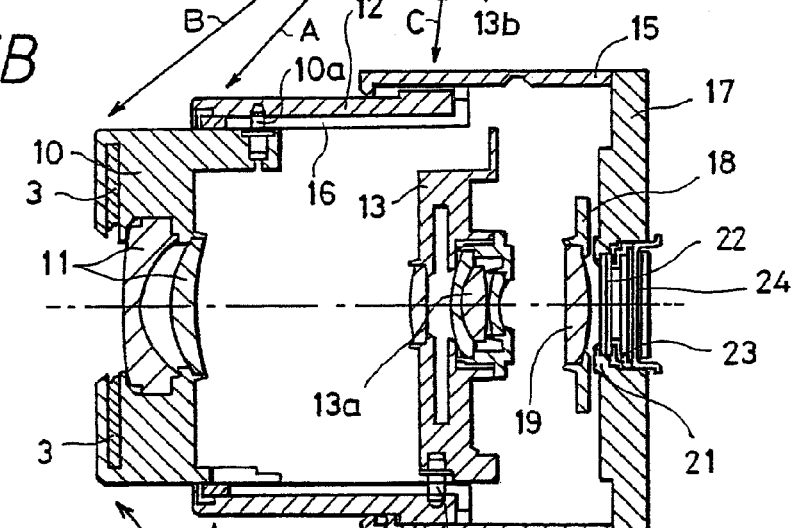
FIG. 5B is a sectional view showing the wide position of the same optical unit.
Figure 5C:
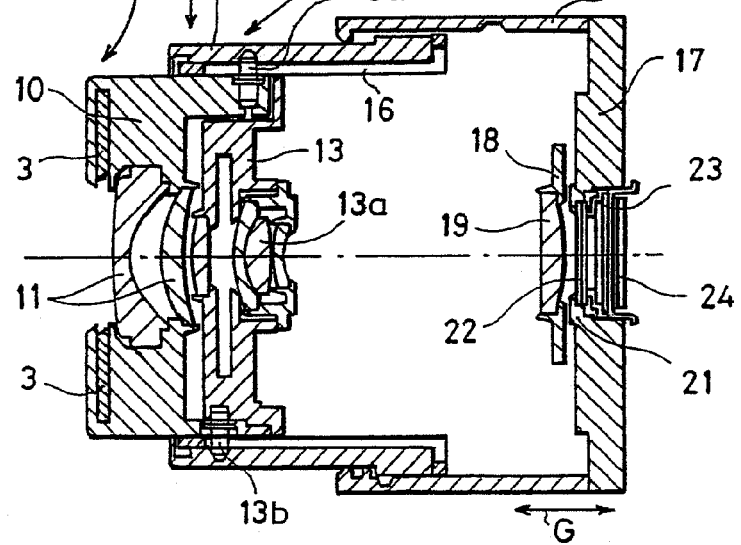
FIG. 5C is a sectional view showing the telephoto position of the same optical unit.
Figure 6:
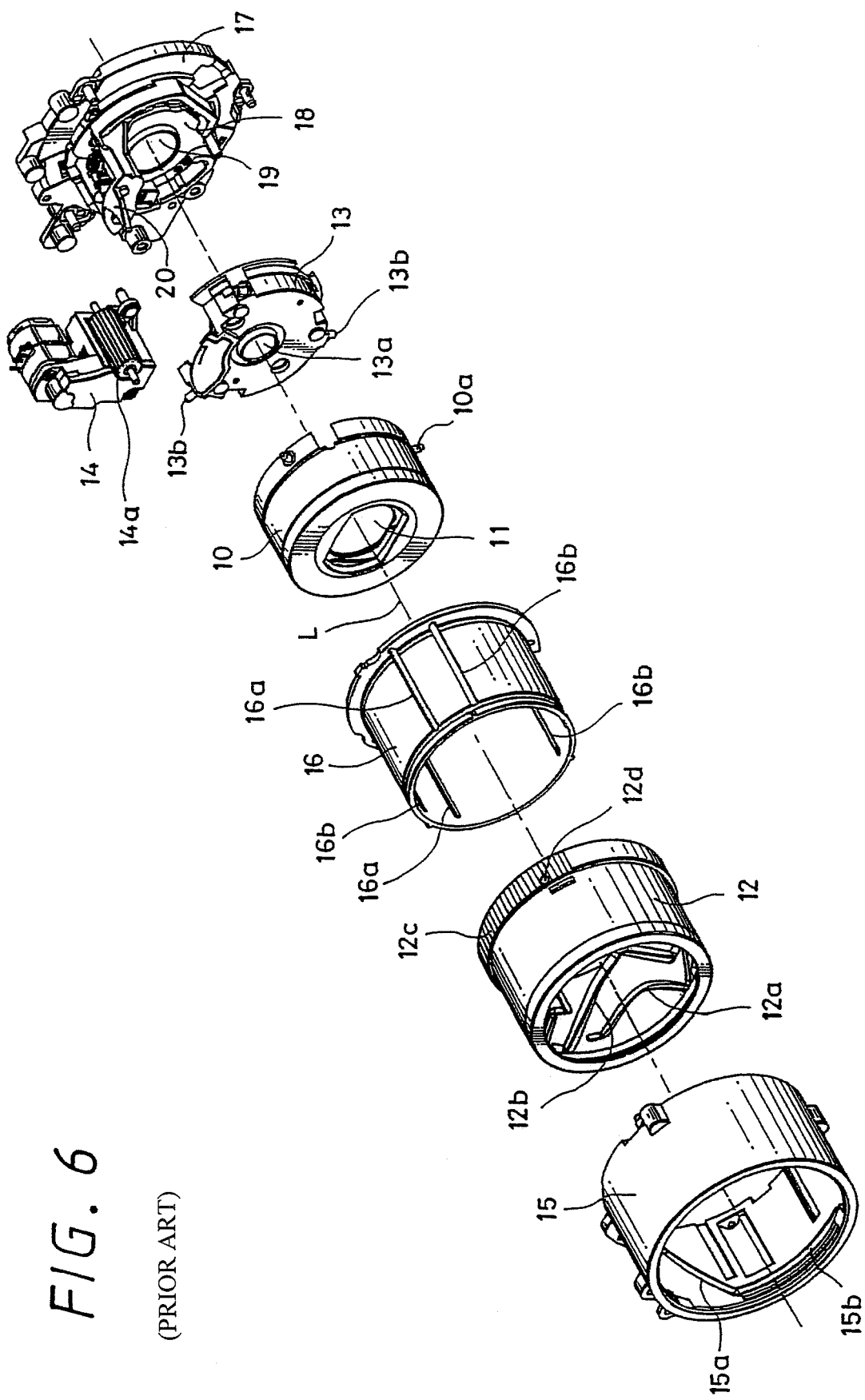
FIG. 6 is a perspective view of the conventional optical unit in an exploded manner.
Figure 7:
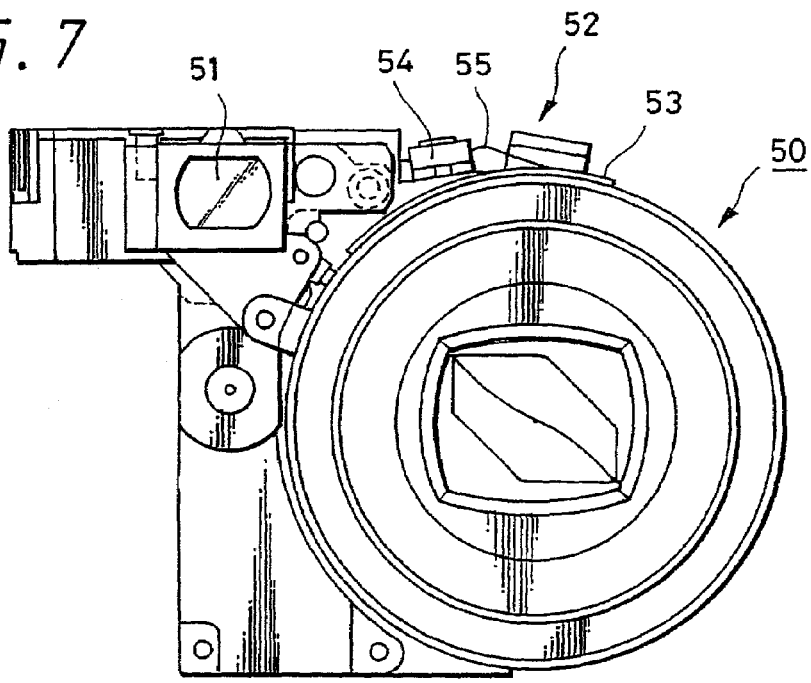
FIG. 7 is a front view showing an example in which a lens position detecting means of a conventional optical unit is based on an electric contact system.
Figure 8:
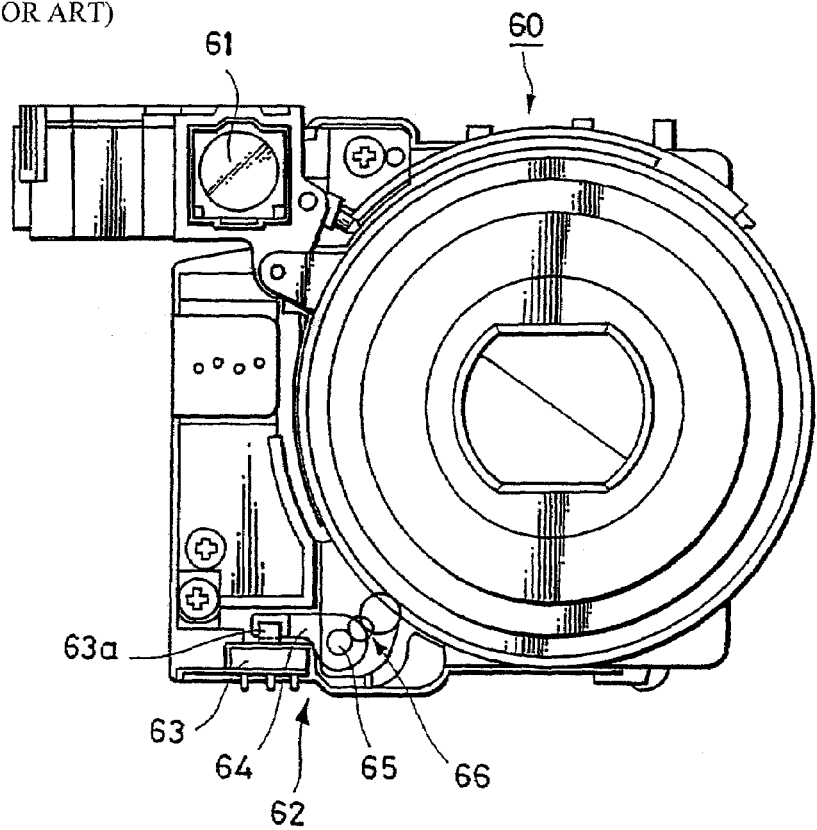
FIG. 8 is a front view showing an example in which a lens position detecting means of a conventional optical unit is based on a variable resistor system.

Hereupon, the zooming operation in which the first group lens frame 10 holding a plurality of lenses 11 and the second group lens frame 13 holding a plurality of lenses 13a move from the collapsed position in FIG. 1A to the wide position in FIG. 1B, and from the wide position in FIG. 1B to the telephoto position in FIG. 1C by driving to rotate the cam ring 12 is performed in the same way as described in FIGS. 5A, 5B, and 5C.

The present invention is characterized in that a position-detecting means for detecting a position of the lens barrel is provided inside the movable lens barrel, in the collapsible type optical unit where at least one lens barrel is movable with respect to the fixed barrel along the direction of its optical axis and an image-pickup means is provided behind the lens barrel; and accordingly, dynamic range of a focusing lens portion is controlled, a collision between lens portions within the lens barrel is prevented to avoid malfunction, and accuracy of the optical position is improved.

Figure 2:
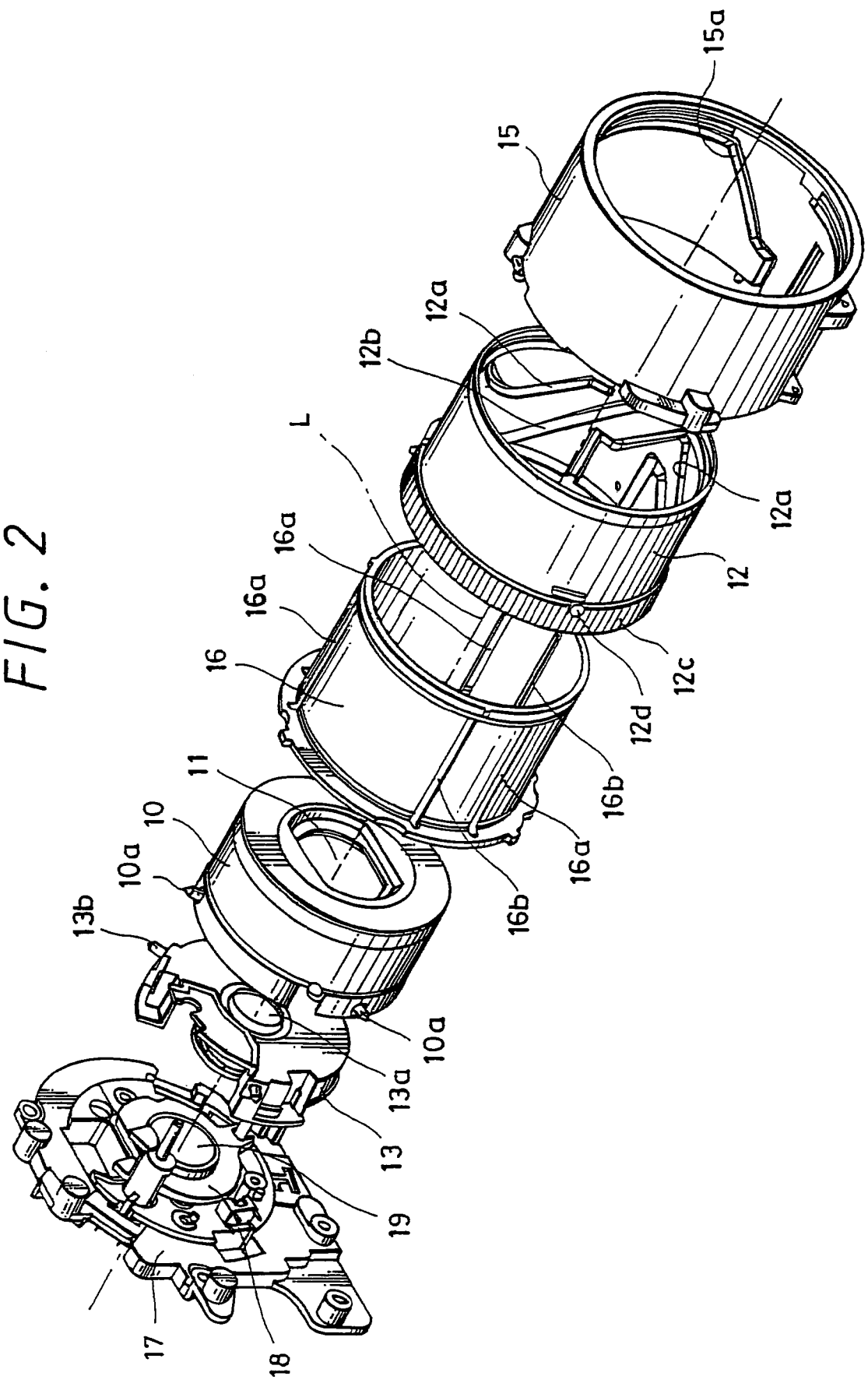
FIG. 2 is a perspective view showing the optical unit in FIG. 1 in an exploded manner.
Figure 3:
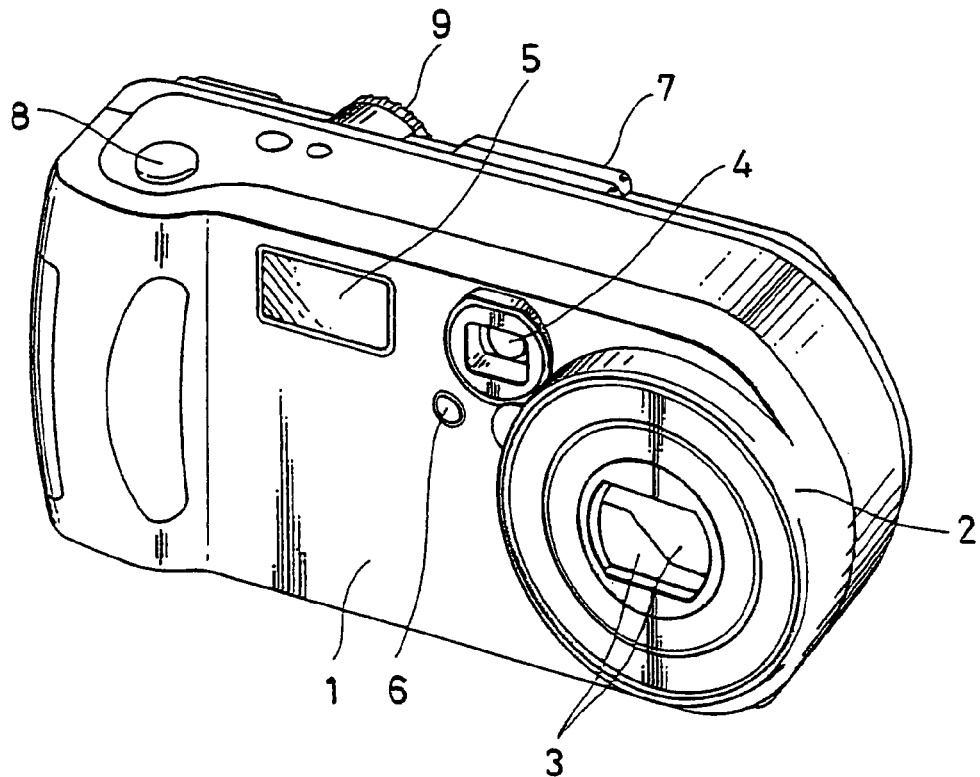
FIG. 3 is a perspective view showing an appearance of a digital still camera in which the optical unit is in the collapsed state.
Figure 4:
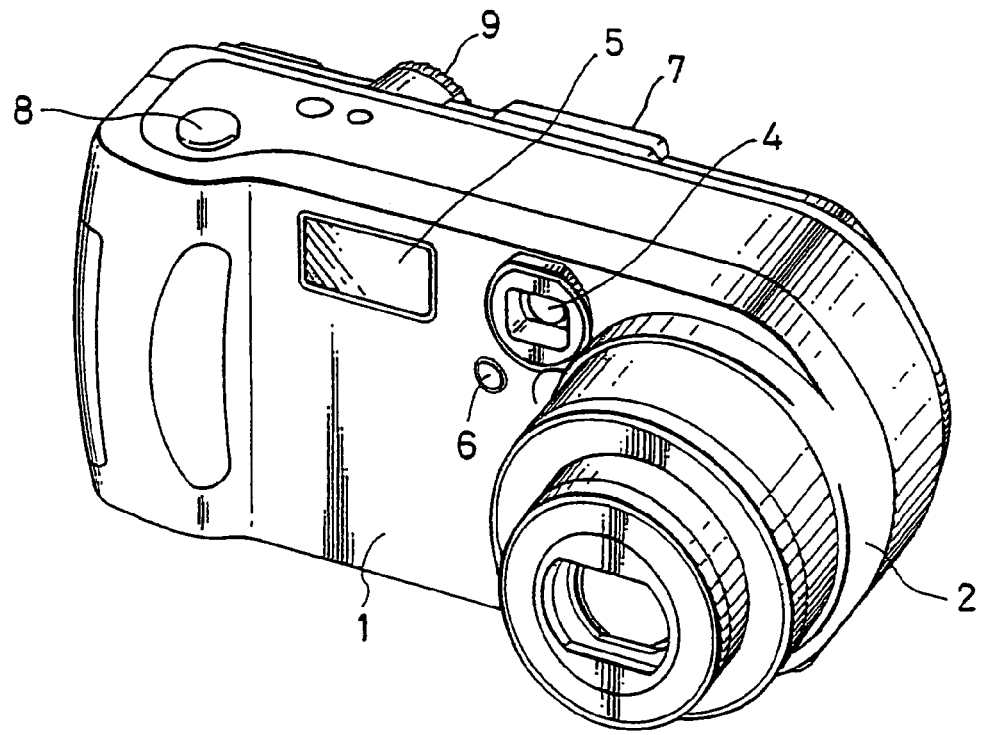
FIG. 4 is a perspective view showing an appearance of a digital still camera in which the optical unit is elongated in the wide or telephoto state.

Hereinafter, a lens-position detecting mechanism of the optical unit will be described with reference to FIGS. 1A to 1C and FIG. 2. FIG. 2 is an exploded perspective view of the optical unit.

In FIGS. 1A to 1C, a numeral 10 denotes the first group lens frame for holding a plurality of lenses 11, and a numeral 12 denotes the cam ring for supporting the first group lens frame 10 to be movable in the direction of its optical axis. Further, a numeral 13 denotes the second group lens frame for holding a plurality of lenses 13a, and a numeral 16 denotes the straight-forward guide ring for supporting the second group lens frame 13 to be movable in the direction of its optical axis.

Further, a numeral 15 denotes the fixed ring for supporting the cam ring 12 to be movable in the direction of its optical axis, and the fixed ring 15 is fixed integrally on the front surface of the rear barrel 17. The rear barrel 17 holds the optical filter 22 and solid-state image-pickup device 24, and the seal rubber 23 is provided between the filter and device. Further, in front of the optical filter 22 is arranged a lens 19 retained by the third group lens frame 18.

Furthermore, a fin-like projection 71 protruding toward the rear barrel 17 is provided on the back surface side of the second group lens frame 13. This projection 71 extends approximately in parallel with an optical axis of the image-pickup lens portion 2 and is arranged to be positioned outside the outer circumferential surface of the third group lens frame 18 holding the lens 19. A photo-sensor 72 for detecting the projection 71 is mounted on the rear barrel 17 through a mounting bracket 73. The projection 71 is made to oppose a detecting portion of the photo-sensor 72, so that when the projection 71 enters the detecting portion, a position of the second group lens frame 13 is detected.

In this embodiment, the projection 71 and photo-sensor 72 form a specific example of the position-detecting means for detecting a position of the lens barrel. This position-detecting means can detect a state in which the second group lens frame 13 retreats and most approaches the third group lens frame 13. In this case, the projection 71 and photo-sensor 72 are mounted such that the second group lens frame 13 will stop immediately before coming in contact with the third group lens frame 18.

Next, operation of the lens will be described.

By driving the cam ring 12 through the gear portion 12c, the cam pin 12d moves forward from the lens-collapsed state to the wide position while rotating along the cam groove 15a of the fixed ring 15 (arrow mark A). At this moment, with respect to the first group lens frame 10 and second group lens frame 13, the cam pin 10a moves in the forward and backward direction along the cam groove 12a and the cam pin 13b moves in the forward and backward direction along the cam groove 12b, respectively. Accordingly, the optical unit comes in the predetermined optical wide position (arrow mark B and arrow mark C).

Moreover, between the optical wide and telephoto positions, the cam ring 12 also rotates by being driven by the gear portion 12c. Because the cam groove 15a of the fixed ring 15 in this range is formed such that the cam ring 12 will not move forward or backward, its movement becomes as shown by an arrow mark D. At this time, with respect to the first group lens frame 10, the cam pin 10a moves forward and backward along the cam groove 15a, and with respect to the second group lens frame 13, the cam pin 13b moves forward and backward along the cam groove 12b, thus, moving between the optical wide and telephoto positions through the predetermined optical position (arrow mark E and arrow mark F).

The collapsing of lens and zoom operation are performed by the above-described driving of the first group lens frame 10, the second group lens frame 13, and the cam ring 12, whereas the focusing lens portion, that is, the third group lens frame 18 is driven forward and backward for focusing by the other driving source (arrow mark G).

In this case, between the collapsed state in FIG. 1A and the wide position in FIG. 1B, if the focusing lens portion moves through a full predetermined optical range, the second group lens frame 13 will collide with the third group lens frame 18. On the other hand, between the wide state in FIG. 1B and telephoto state in FIG. 1C, the second group lens frame 13 moves forward, so that no collision will occur between lenses.

Accordingly, it is necessary to detect a zoom position of the lens and limit the range of moving the focusing lens portion between the collapsed position and wide position. Thus, in the present invention, the projection 71 provided on the second group lens frame 13 is detected by the photo-sensor 72 mounted on the rear barrel 17, so that the zoom state of the lens can be detected.

In other words, because the second group lens frame 13 always moves forward between the collapsed state in FIG. 1A and the telephoto state in FIG. 1C, the detecting projection 71 is provided at the rear end of the second group lens frame 13 and is arranged to enter a detecting portion of the photo-sensor 72 in the collapsed state in FIG. 1A and to retreat from the photo-sensor 72 in the wide state in FIG. 1B, thereby enabling the wide position to be detected. In addition, between the wide state in FIG. 1B and the telephoto state in FIG. 1C, the detecting projection 71 always retreats from the photo-sensor 72.

Accordingly, there can be performed such control as to limit a dynamic range of the focusing lens portion when the photo-sensor 72 is ON and to allow the focusing lens portion to move in a full dynamic range when the photo-sensor is OFF. Therefore, such control enables the collision between the second group lens frame 13 and third group lens frame 18 that is the focusing lens portion to be avoided. Furthermore, because the position-detecting means is provided to detect the wide position, the means can also be used for the purpose of improving accuracy of zoom position.

INDUSTRIAL APPLICABILITY

The present invention is not limited to the embodiment described above and shown in the drawings. Various modifications can be made without departing from the scope of claims of the invention.

For example, although the above-described embodiment has such structure that the projection 71 is provided on the second group lens frame 13 and the photo-sensor 72 is mounted on the rear barrel 17, the photo-sensor 72 may be mounted on the second group lens frame 13 and the projection 71 may be provided on the rear barrel 17, inversely. Moreover, a structure in which the projection is detected by other sensors than the photo-sensor can also be adopted. Furthermore, the shape of the projection 71 is not limited to that of the above embodiment. For example, a stick-shaped member such as a round or angular stick and others in various shapes can be applied.

Having described so far the embodiment in which the photo-sensor 72 is mounted on the rear barrel 17, the photo-sensor 72 or projection 71 may be mounted on the inside of fixed ring 15. In addition, the optical unit of the present invention is not limited to a lens structure consisting of three groups. When there are two, or three or more lens barrels moving with respect to the fixed barrel, two or three or more position-detecting means can be provided in order to detect positions of those lens barrels.

Furthermore, as to the driving source of a collapsible type lens, other than a general DC motor or stepping motor an ultrasonic motor and the like can be employed. Moreover, the gear mechanism is not necessarily employed and a direct driving by, for example, an ultrasonic motor, a linear motor or the like may be employed. In addition, a collapsing structure of the collapsible type lens is not limited to a cam mechanism having the cam groove and cam pin; and the mechanism can widely be applied to a mechanism in which an optical lens system can be retracted into a thin shape in the collapsible manner.

As described above, according to the optical unit of the present application, because the position-detecting means is provided on the lens barrel movable along the direction of optical axis within the fixed barrel, it is possible to eliminate a projection and the like on the exterior portion to be small in size and to restrict an increase in the number of components and the number of processes at its minimum. Moreover, since the non-contact sensor is used as the position-detecting means, it is possible to acquire information on the position without a mechanical loss such as a load to lenses occurring.

Further, according to the image-pickup apparatus including the optical unit of the present application, because the optical unit capable of being small in size can be employed as a camera unit such as the digital still camera and digital video camera, it is possible to make the whole image-pickup apparatus small in size and light in weight.

The invention claimed is:

1. An optical unit of a collapsible type having an optical axis in which at least one lens barrel is movable along the direction of the optical axis with respect to a fixed barrel and image-pickup means provided behind said lens barrel, comprising:

a zoom lens frame having a zoom lens, said zoom lens frame within the one lens barrel and movable along the direction of the optical axis, said zoom lens being capable of setting a zoom range by changing a position in said optical axis direction by movement of said zoom lens toward a telephoto position when said zoom lens is between a collapsed position and the telephoto position; and position-detecting means provided within the fixed barrel for detecting a position of the zoom lens frame, wherein a position of said zoom lens frame is detected by the position-detecting means between said collapsed position and a wide position, and wherein a position of said zoom lens frame is not detected by the position-detecting means between the wide position and the telephoto position.

2. An optical unit according to claim 1, wherein said position-detecting means includes a fin-shaped projection provided in one of said fixed barrel and said movable lens barrel and a photo-sensor provided in the other of said fixed barrel and said movable lens barrel.

3. An optical unit according to claim 1, further comprising a focusing lens, said focusing lens driven by driving sources.

4. An image-pickup apparatus including a collapsible type optical unit having an optical axis and a fixed barrel, comprising:

at least one lens barrel movable with respect to the fixed barrel along the direction of the optical axis, said one lens barrel including a zoom lens frame having a zoom lens, said zoom lens being capable of setting a zoom range by changing a position in said optical axis direction by movement of said zoom lens toward a telephoto position when said zoom lens is between a collapsed position and the telephoto position;

image-pickup means arranged behind said lens barrel; and position-detecting means provided within the fixed barrel for detecting a position of the one lens barrel, wherein a position of said zoom lens frame is detected by said position-detecting means between said collapsed position and a wide position, and wherein a position of said zoom lens frame is not detected by the position-detecting means between the wide position and the telephoto position, and wherein said image-pickup apparatus is a camera.

5. An optical unit according to claim 4, further comprising a focusing lens, said focusing lens driven by driving sources.

* * * * *